United States Patent [19]

Steinberger

[11] Patent Number: 4,624,466
[45] Date of Patent: Nov. 25, 1986

[54] ROTARY CHUCK
[75] Inventor: Josef Steinberger, Düsseldorf, Fed. Rep. of Germany
[73] Assignee: Paul Forkardt GmbH & Co. KG, Düsseldorf, Fed. Rep. of Germany
[21] Appl. No.: 762,773
[22] Filed: Aug. 5, 1985

Related U.S. Application Data
[63] Continuation-in-part of Ser. No. 481,072, Mar. 31, 1983, abandoned.

[30] Foreign Application Priority Data
Apr. 6, 1982 [DE] Fed. Rep. of Germany ....... 3212761

[51] Int. Cl.[4] .............................................. B23B 31/16
[52] U.S. Cl. .................... 279/1 R; 279/119; 279/121
[58] Field of Search ............ 279/1 R, 1 H, 1 ME, 279/110, 111, 123, 119, 121, 155; 82/DIG. 7

[56] References Cited
U.S. PATENT DOCUMENTS 1,364,783  1/1921  Morgan ................................. 279/119
3,542,386  11/1970 Becker .................................. 279/121
4,254,676  3/1981  Wilson ............................... 279/110 X Primary Examiner—Z. R. Bilinsky
Attorney, Agent, or Firm—Becker & Becker, Inc.

[57] ABSTRACT

A rotary chuck having a plurality of clamping elements for clamping a respective workpiece. The clamping elements are interchangeable for adaptation of different dimensions of the workpieces, and can be actuated by a force operation via a direction-changing chuck or drive. At least one of the clamping elements is provided with a tension detector. So that the tension detector can always be ready for measuring, and in order to avoid adulteration or error of the measured values and disturbances during transmission of the measured values due to a changing or displacement of the clamping element part which directly engages the workpiece relative to the drive members thereof, the tension detector is arranged with respect to a component which, as viewed in the direction of the force introduced from the force operation, is located after the direction-changing chuck or drive and ahead of the separating point between that clamping element part which directly engages the workpiece and the drive part for the clamping element part, which drive part remains in place during an exchange of the clamping element part in the chuck.

6 Claims, 2 Drawing Figures

ROTARY CHUCK

BACKGROUND OF THE INVENTION

This is a continuation-in-part application of co-pending U.S. patent application Ser. No. 481,072-Steinberger, filed Mar. 31, 1983, now abandoned.

FIELD OF THE INVENTION

The present invention relates to a rotary chuck which is provided with a plurality of clamping elements for engaging the respective workpiece; the clamping elements are interchangeable for adapting to the different dimensions of the workpieces, and can be actuated by a power operation via a guide or direction-changing chuck gear unit or drive; at least one of the clamping elements is provided with a clamping pressure, strain or tightening stress detector.

DESCRIPTION OF THE PRIOR ART

Rotary chucks of the aforementioned general type, according to U.S. Pat. No. 4,254,676-Wilson dated Mar. 10, 1981, are already known according to which a clamping pressure, strain or tightening stress detector is arranged in each clamping element in the vicinity of the clamping surface for the workpiece. Via this force detector, the force, clamping pressure or tightening stress, which occurs between the chuck and the workpiece, is determined. This force not only is indicated or recorded, but if necessary also is used for control purposes, especially in order to adapt the respectively required clamping pressure or tightening stress to the requirements which exist in a particular situation.

Heretofore known configurations have the drawback that in practice it is difficult, if not entirely impossible, to convey the relatively small measured values out of the clamping elements of the rotary chuck outwardly to a stationary instrument. This is a drawback, especially since the top jaws of the clamping elements, as opposed to the jaws, must be capable of being moved in the radial direction in order to be adaptable to the various diameters of the workpieces, and must be interchangeable in order to be adaptable to the various workpieces. With such a displacement, there exists danger that the electrical connections can be affected; these electrical connections are required for passing the measured values from the strain or tightening stress detectors through the chuck body to the stationary instrument, because separation locations or disconnecting points such as couplings or attachments, must be provided in the instrument leads. These separation locations or disconnecting points change the electrical resistance of the instrument leads, particularly when cooling-fluids and cutting fluids get to the separating locations or disconnecting points or these locations/points wear via frequent use thereof.

It is an object of the present invention to provide a rotary chuck having an arrangement of the strain or tightening stress detectors or sensors which is satisfactory in practice and is suitable for the rough all-day operation, and which avoids difficulties during the transmission of the measured values.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
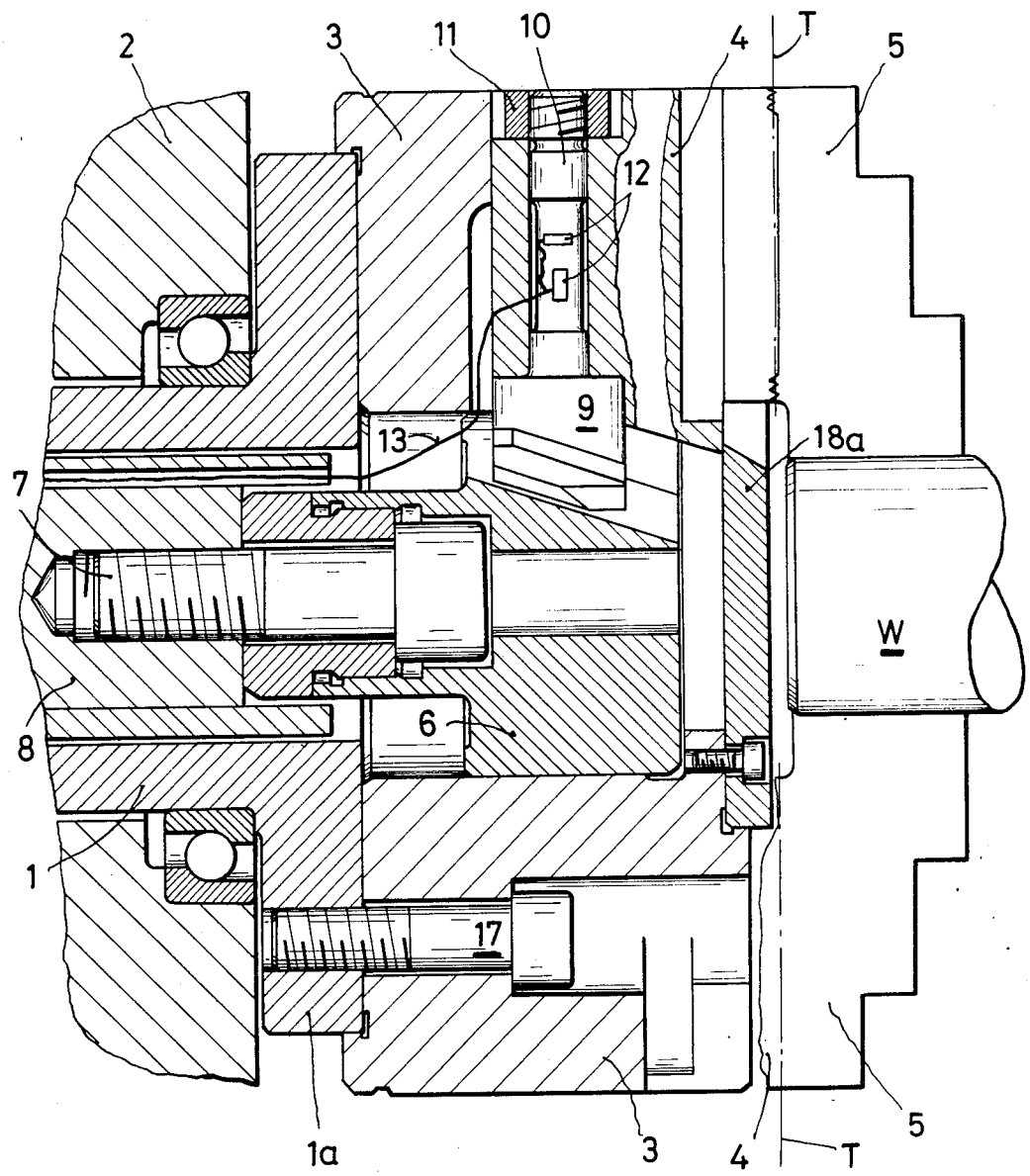
FIG. 1 is a longitudinal sectioned view taken through a first embodiment of the inventive rotary chuck.

According to the present inventive proposal, there is achieved the advantage that the measuring lines which lead to the strain or tightening stress detector are not touched or contacted during an exchange or a displacement of the top jaw relative to the base jaw; furthermore, the force measurement takes place at a location of the rotary chuck which is arranged within the chuck in a protected manner. Thus, expensive electrical connections can be eliminated which overlap or cross the separating location or joint face between the interchangeable jaws and the remaining parts of the chuck. These electrical connections can be the cause for functional disturbances or malfunctions during measurement of the strain or tightening stress, especially during a displacement or exchange of the top jaws. The inventive strain or tightening stress detector is arranged in a protected manner in those parts of the chuck which have enough space for such an installation, with different types of installation being preferred for the different types of chucks.

With a chuck having a wedge-type chuck, gear unit or drive for power reorientation or changing the direction of the force between the chuck piston and the clamping elements consisting of base jaws and top jaws, according to the present invention there is proposed to mount at least the wedge hook of one base jaw on the base jaw body via an elongation element provided with strain gauges or stress measuring strips for determining the strain or tightening stress. A necked-down bolt is preferably used as the elongation or stretch element.

Pursuant to a further feature of the present invention, with a chuck having a lever direction-changing chuck, gear unit or drive for changing the direction of the force between the chuck piston and the clamping elements, a force measuring member may be arranged between at least one lever of the direction-changing chuck, gear unit or drive and the base jaw provided therewith. This force measuring member is a pressure stressed pin which is provided with force measuring strips (e.g. strain or stress measuring strips), and is arranged in a bore of the base jaw.

Pursuant to the present invention, a rotary chuck is provided where the strain or tightening stress detector is not arranged on parts which have to be interchanged or displaced during displacement or exchange of the top jaws; rather, the strain or tightening stress detector is placed in the chuck in such a way that it is always ready for operation and is not affected by a displacement or exchange of the jaws. In this way, the strain or tightening stress detector is always ready for measuring not only when the chuck is stationary but also when it rotates, so that the strain or tightening stress detector delivers satisfactory measured values in every state of operation of the clamped-in workpiece. These measured values can be used as control or adjustment factors for the clamping force of the chuck.

DESCRIPTION OF THE PREFERRED EMBODIMENTS

Referring now to the drawings in detail. FIG. 1 illustrates the front end of a spindle 1 of a machine tool. The spindle 1 is mounted in a headstock 2, and is provided with a spindle flange 1a for mounting a chuck.

The chuck, which is illustrated as a three-jaw chuck, includes a chuck body 3 in which three base or primary jaws 4 are guided in radial guides in such a way that they are radially adjustable. Top or adapter jaws 5 are mounted on that end face of the base jaws 4 projecting from the front of the chuck body 3. The top jaws 5 serve for the clamping of a workpiece W. In the illustrated embodiment, the top jaws 5 are connected with the base jaws 4 by means of a V-notch tooth chuck or drive, and consequently can be shifted relative to the base jaws 4, or can be exchanged for other top jaws 5. The separating location or joint face T between the top jaws 5 and the base jaws 4 is indicated by a dot-dash line.

The radial displacement of the base jaws 4 is effected by a chuck piston 6 which is axially displaceable in a central bore of the chuck body 3. The chuck piston 6 is connected by means of a draw-in bolt or pull screw 7 with a pull rod 8 which is actuated by a pressure-medium cylinder arranged at the other end of the spindle 1.

In the embodiment of FIG. 1, a wedge-type chuck or drive serves to convert the axial displacement movement of the chuck piston 6 into a radial displacement movement of the clamping elements, which comprise the top jaws 5 and the base jaws 4. This wedge-type chuck or drive comprises a wedge hook 9 which engages in a corresponding recess of the chuck piston 6, and is mounted on the pertaining base jaw 4. This mounting is effected by means of a necked-down shaft 10 which is provided on the wedge hook 9, and the upper end, i.e. radially outer end, of which is provided with a thread. By means of this thread, the necked-down shaft 10, and hence the wedge hook 9, are secured in position by a nut 11 on the top or outer side of the base jaw 4.

On the necked-down shaft 10 there are disposed strain gauges or stress measuring strips 12 which, when clamping pressure or tightening stress is applied, and when centrifugal force occurs, measure the stress or elongation of the necked-down shaft 10. The measured values are fed via a line 13 from the chuck body 3 via the spindle 1 to a stationary measuring and indicating device which is not shown in the drawing.

When clamping pressure or tightening stress is applied for the outer clamping illustrated in FIG. 1, the necked-down shaft 10 is stressed with clamping pressure or tightening stress forces. These forces are detected by the strain gauges or stress measuring strips 12, and are conveyed out of the chuck body 3 via the line 13. Superimposed on the detected clamping pressure or tightening stress forces there are centrifugal forces which result upon rotation of the chuck. A suitable construction or formation of the indicating and measuring device assures that not only the magnitude of the clamping pressure or tightening stress can be determined at any given time, but also that the clamping pressure or tightening stress can be kept constant, despite the centrifugal forces which depend upon the speed, by adjusting the clamping pressure or tightening stress force in the pull rod 8.

Figure 2:
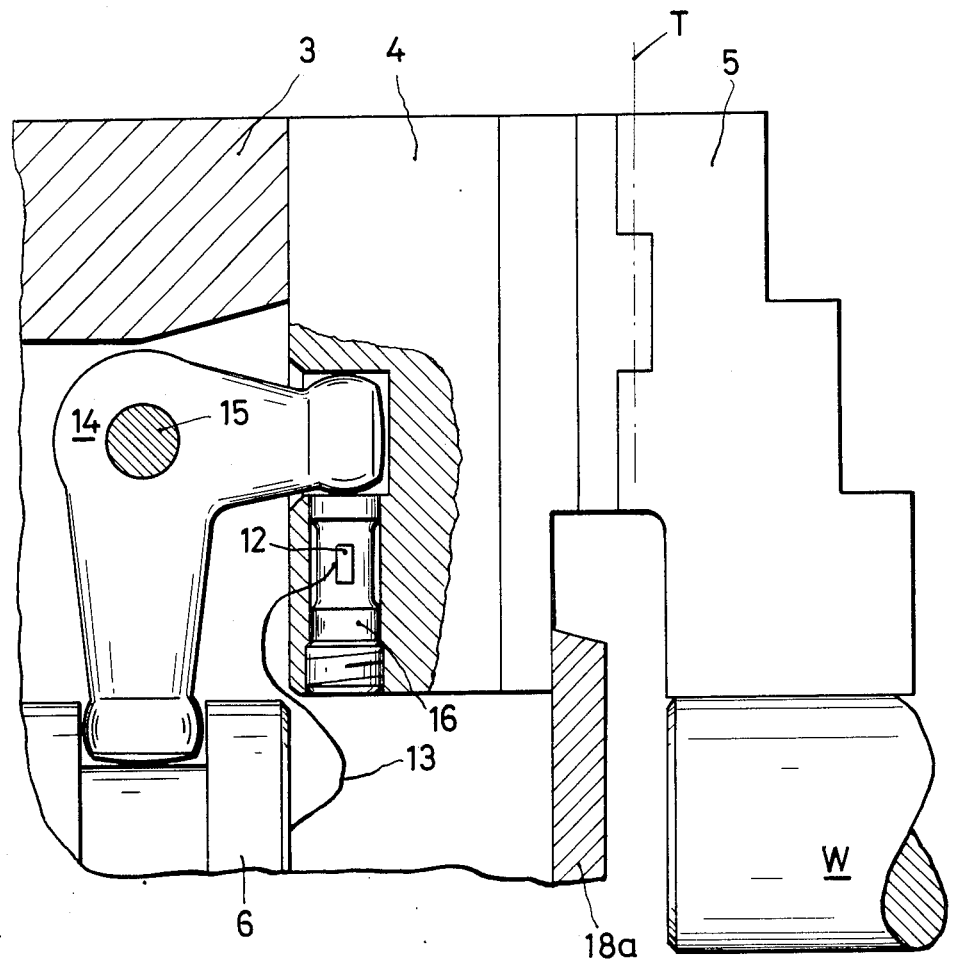
FIG. 2 is a longitudinal sectioned view taken through a second embodiment.

In the second embodiment of FIG. 2, there is shown in longitudinal sectioned view that part of the chuck where a lever guide gear unit or drive serves for changing the direction of the force between the chuck piston 6 and the clamping elements, each of which again is formed by a base jaw 4 and a top jaw 5. The two-arm angle lever 14 which is used for this change of direction of force is mounted on a bearing pin 15 in the chuck body 3. One arm of the lever 14 engages a groove of the chuck piston 6, and the other arm of the lever 14 engages in a recess or notch in the pertaining base jaw 4; in both cases, the contact surfaces are crowned.

In order to be able to measure the forces which occur due to clamping pressure or tightening stress forces and centrifugal forces, a force-measuring member is disposed between at least one angle lever 14 and the pertaining base jaw 4. In the embodiment illustrated in FIG. 2, this force-measuring member comprises a pressure-stressed pin 16 by means of which the force of the angle lever 14 is introduced into the base jaw 4. This thrust pin 44 is also provided with strain gauges or stress measuring strips 12, which convey the values, which correspond to the resulting force, over line 13 out of the chuck body 3 to a non-illustrated indicating and measuring device.

In accordance with the arrangement of the prior art represented by the Wilson U.S. Pat. No. 4,254,676, there exists the danger that electrical connections are influenced or interrupted especially when small measured values are to be transmitted across a separating location or joint face. The problems encountered with the prior art according to the Wilson patent are exactly those which are taken care of and overcome in accordance with the features of the present invention.

There must be considered important in accordance with the present invention that a strain gauge 12 is provided as arranged in the base jaw 4 which means in a location between the direction-changing drive and the separating location or joint face defined by the base jaw 4 and the top or adaptor jaw 5. In accordance with the present invention, the structural arrangement is such that the strain gauge 12 remains or stays in place even when the top or adaptor jaw 5 is interchanged in the chuck and also remains in place during a shift of the top or adaptor jaw 5 relative to the base jaw 4. The arrangement of the present invention as to the strain gauge 12 in the base jaw avoids any and all difficulty otherwise encountered in the prior art during the transfer of the measured values of the clamping force or tightening stress even under circumstances when the chuck is arranged in a work space of a machine tool and consequently must be considered to be subjected not only to high rotational speeds but rather also being subjected to wetting with chip- and cooling fluid as well as mechanical loading by chips removed from the workpiece during machining operations.

The favorable result in accordance with the arrangement of the present invention is attributable to the fact that the strain gauge or stress measuring strip 12 has a location no longer in the clamping surface between the workpiece and the adaptor jaw where only a direct encountering of the clamping forces would exist but rather there has been found adequate and sufficient in accordance with the teaching of the present invention to utilize only an indirect measurement of the clamping forces or tightening stress on the basis of a reaction force in a structural part of the chuck accompanied by the advantage that strain gauge or stress measuring strip has a location where the strain gauge or stress measuring strip is sufficiently protected; furthermore, the strain gauge or stress measuring strip 12 is not engaged or contacted during an interchange or displacement of the adaptor jaw 5; and finally, the clamping force or tightening stress is sensed at a location (when considered from the clamping location of the workpiece) to be ahead of or before the directional-change drive. Hereby there is assured and guaranteed that frictional forces do not falsify or make erroneous any measured values that are obtained even though such frictinnal forces may arise or be encountered in this directional-change drive.

The U.S. Pat. No. 3,542,386-Becker, dated Nov. 24, 1970 and belonging to the assignee of the present invention, does not show any transducer or clamping-force detector or sensor at all and under these circumstances there exists no basis for any modification of the Becker patent either in view of Wilson U.S. Pat. No. 4,254,676 or Morgan U.S. Pat. No. 1,364,783, dated Jan. 4, 1921.

The Morgan U.S. Pat. No. 1,364,783 may show a so-called lever chuck but in spite of the fact that such a lever chuck existed since Jan. 4, 1921 for the Morgan patent there exists no arrangement of the clamping force detector or sensor in the base jaw 4 or in a part within this base jaw 4.

An inventive contribution has been made for the arrangement of the present disclosure, since the prior art does not provide any basis for eliminating a previous belief that the absolute size of the encountered clamping force must be measured. Rather in accordance with the present invention, there is to be pointed out that a reaction force as a representative value which is proportional to the respective clamping force can be considered sufficient and adequate to fulfill the requirement in accordance with the arrangement of the present invention. The present invention also makes it possible to eliminate and avoid entirely any influencing of the electrical lines such as 13 between detectors and sensors and measuring devices whereby such lines would have to bridge or transfer signals across a separating location or joint face which is no longer necessary in accordance with the arrangement of the present invention. The present invention makes it possible to avoid disadvantages and drawbacks encountered previously in the prior art due to shifting or interchanging of adaptor jaws for machining of workpieces clamped having different diameters that must be handled by the particular chuck used by the machining operation.

The arrangement of the present invention provides a specific base jaw location for the sensor whereby an indirect raction force measurement is undertaken rather than a direct measurement as with the prior art. Any proposal to interrupt one or other jaw of the Wilson patent, for example, as being equivalent to the base jaw 4 of the present disclosurc cannot be taken to be a valid modification justified by any proposal or suggestion in any of the prior art. The Wilson patent includes a cylinder and an operating piston for actuation of a chuck jaw which is provided with a transducer located in the clamping surface between the chuck jaw and the workpiece so as to encounter an important and decisive drawback and disadvantage since in actuality it is not only difficult but also nearly impossible to convey to a stationary device in a realtively small measured values of the transducer as detected from the chuck jaw when the chuck is rotating because of the fact that the jaw of the Wilson patent must be displacec or shifted relative to the base jaw for the purpose of adaptation to different clamping diameters of the different workpieces.

The strain gauge or stress measuring strip 12 according to the present invention has a location no longer in the clamping surface between the workpiece and the adaptor jaw where only a direct encountering of the clamping forces would exist but rather there has been found adequate and sufficient in accordance with the teaching of the present invention to utilize only an indirect measurement of the clamping forces or tightening stress on the basis of a reaction force in a structural part of the chuck accompanied by the advantage that the strain gauge or stress measuring strip has a location where the strain gauge or stress measuring strip is sufficiently protected.

The strain gauge or stress measuring strip 12 of the present invention is not engaged or contacted at all during an interchange or displacement of the adaptor jaw 5; finally, the clamping force or tightening stress is sensed at a location (when considered from the clamping location on the workpiece) to be ahead of or before the directional-change drive. This assures that frictional forces cannot falsify or make erroneous any measured values that are obtained even though such frictional forces may arise or may be encountered in this directional-change drive.

The Becker patent belonging to the assignee of the present invention does not show or suggest any transducer or clamping-force detector or sensor at all and under these circumstances there exists no basis for any modification of the Becker patent belonging to the assignee of the present invention to be modified either in view of the Wilson patent or the Morgan patent.

None of the prior art provides any basis for eliminating a previous belief that the absolute size of the encountered clamping force must be measured rather in accordance with the present invention, there is to be pointed out that a reaction force as a representative value which is proportional to the respective clamping force can be considered sufficient and adequate to fulfill the requirement in accordance with the arrangement of the present invention. In effect, there is an elimination of structure yet retention and improvement in the function achieved therewith. Also the disadvantages and drawbacks previously encountered in the prior art due to shifting or interchanging of adaptor jaws can now be undertaken.

More specifically, the chuck structure and the placement of the tranducer or clamping pressure detector 12 is an arrangement such that the drive jaw part 4 remains in the chuck during an exchange of the clamping element jaw part 5 relative to the rotary chuck having a body with radial guides. Also, more specifically, the clamping elements in this arrangement are provided as primary jaw parts radially adjustable in the radial guides and movable for engaging a respective workpiece. Specifically, this arrangement defines the direction-changing drive effective relative to the drive jaw part 4 and located ahead of the joint face T between the clamping element jaw part 5 and the drive jaw part 4; thus, measured values of clamping pressure are obtained only indirectly via reaction force by the clamping pressure detector 12 provided relative to said drive jaw part 4 without being subject to interruption and disturbance during adjustment movement and interchange as well as displacement movement of said clamping element jaw part 5. A wedge-type drive is provided for changing the direction of force between the chuck piston and the clamping elements as well as the elongation element 10 having the tension measuring strips 12 thereon as clearly shown in FIG. 1 of the drawings.

The angle lever 14 along with the pressure-stress pin 16 have the measuring strips 12 mounted thereon as shown in FIG. 2. The force-measuring member 16 is a pressure-stress pin provided with the tension measuring strips 12. The base jaw 4, in the area of application of the lever 14, is provided with a definite elongation cross section with which the tension measuring members 12 are associated.

According to Wilson U.S. Pat. No. 4,254,676, a transducer is arranged in a gripping jaw in the vicinity of the clamping surface and is connected via wires with a slip-ring device. These wires must be provided with separating locations or disconnecting points, when the gripping jaw is displaced or interchanged as is the case with modern chucks.

Becker U.S. Pat. No. 3,542,386 shows a chuck with which a driving jaw is separated from the actual jaw carrier, whereby an adjustment of the jaw carrier is possible relative to the driving jaw via an adjusting spindle. This adjustment has the purpose to assure a high rotating accuracy of the individual clamping jaws also under circumstances when the jaws are displaced upon the base jaws or carriers or have been interchanged. The adjusting spindle concerns adjustment members between the jaws and the clamping jaws consisting of gripping jaws and base jaws. The previously known adjusting spindles in a chuck according to Becker U.S. Pat. No. 3,542,386 are actuated accordingly for adjustment of the jaw carriers and jaws and for this reason there must be noted that it would not be possible to arrange any measuring strips on these adjusting spindles as is the case in accordance with FIG. 1 of the present inventive disclosure. The adjusting spindles of the prior art particularly must be noted to be turned or rotated so that a mounting of wires or instrument leads on such measuring strip would be impossible.

In this connection there can be noted also that the necked-down shaft 10 according to FIG. 1 of the present application cannot be considered to be turned or rotated relative to the base jaw 4. The thread on this necked-down shaft 10 serves only for receiving the nut 11. With the present inventive arrangement there is noted that no rotation or turning of the necked-down shaft 10 occurs at all so that the wires or instrument leads 13 leading from the measuring strips 12 can be displaced without difficulty. The Morgan U.S. Pat. No. 1,364,783 has no relevence to the features according to FIG. 2 in the present case. The Morgan U.S. Pat. No. 1,364,783 includes two arms 12 of a lever 13 effective directly upon the base jaw 9. Consequently no transfer occurs via any pressure-stress pin 16 according to the present inventive arrangement. If measuring strips were applied or mounted on the parts of Morgan U.S. Pat. No. 1,364,783, there would not exist any technically reasonable or rational possibility to guide or convey the wires or instrument leads from these measuring strips to a signal transfer since both of the parts involved therewith would be turned or rotated necessarily due to the structural arrangement involved therewith.

In conclusion, the present invention relates to a rotating chuck for machine tools with several jaws or clamping elements 4, 5 guided in radial direction in a chuck body 3. The base jaws 4 and top jaws 5 are actuatable via a wedge hook or reversing drive 9 respectively 14 by a drive element or chuck piston 6 shiftable in axial direction via a drive such that the jaws move in radial direction within the chuck body 3 for grasping or releasing of a workpiece W, whereby the jaws 4, 5 are subdivided into a base or primary jaw 4 and a top or adaptor jaw 5 for matching or adaptation to differing diameters of the workpieces W to be clamped. The top or adaptor jaws 5 thereof can be noted as being fastened not only interchangeably on the base jaw 4 but rather also being fastened displaceably thereon relative to the base jaw 4 and whereby furthermore the remaining base jaw 4 remaining in the chuck body 3 during an interchange and during an adjustment of the top or adaptor jaw 5 cooperate with direction-changing chuck, gear unit or drive 9 respectively 4, whereby at least one transducer is arranged in the chuck body 4 transmitting the clamping force applied by the clamping jaws 4, 5 upon the workpiece W. The foregoing is characterized still further by the improvement in combination therewith that for the purpose of prevention of an interruption of the signal wire or lead during an interchange or during a displacement of the top or adaptor jaw 5 that the transducer or measuring strip 12 is arranged respectively as the case may be in such a manner in the base jaw 4 that the radial force introduced from the drive element or chuck piston 6 via the direction-changing chuck, gear unit or drive 9 respectively 14 is introduced into the base jaw 4 so as to be detected or transmitted. This means that the force detection occurs at a location which is located behind or after the direction-changing chuck, gear unit or drive 9 respectively 14 but before or ahead of the separating point T between the base jaw 4 and the top or adaptor jaw 5, so that the connection of the transducer or measuring strip 12 with the signal lead, wire or line 13 is not separated or interrupted during an interchanging of the top or adaptor jaw 5.

The foregoing chuck furthermore is provided with a direction-changing chuck, gear unit or drive including and comprising a wedge hook 9, whereby the wedge hook 9 is separate from the actual base jaw 4; this is characterized still further thereby that the wedge hook 9 is fastened non-rotatably on the base jaw 4 by means of an elongation element or necked-down shaft 10, whereby the radial force is introduced via the necked-down shaft 10 into the base jaw 4 and that at least one transducer or force-receiving measuring strip 12 is arranged on this necked-down shaft 10.

The chuck body further includes a direction-changing chuck, gear unit or drive comprising a two-arm angle lever 14 such that the radial force introduced by the angle lever 14 into the base jaw 4 is effective upon a pressure-stressed pin 16, which is arranged in the base jaw 4 and which is provided with at least one transducer or force-receiving measuring strip 12.

The present invention is, of course, in no way restricted to the specific disclosure of the specification and drawings, but also encompasses any modifications within the scope of the appended claims.

What I claim is:

1. A rotary chuck for machine tools with multiple clamping jaws guided in radial direction in a chuck body, said jaws beig actuatable via a direction-changing drive mechanism by a drive element shiftable in axial direction by a drive so that said clamping jaws move in radial direction with the chuck body for gripping respectively releasing a workpiece, whereby said clamping jaws are subdivided into a base jaw and a top jaw for adaptation to different diameters of workpieces to be clamped therewith, said top jaw being secured interchangeably on the base jaw and also being secured therewith displaceably relative to the base jaw, and whereby the base jaw remaining in the chuck body during changing and adjustment of the top jaw cooperates with the direction-changing drive mechanism, whereby for determination of the clamping force applied to the workpiece by the clamping jaws there is provided the improvment therewith comprising:

at least one force measuring strip arranged in the chuck body, said force measuring strip being arranged respectively in the base jaw so that for prevention of any interruption of any signal line during changing, as well as displacement of the top jaw, such that radial force introduced by the drive element via the direction-changing drive mechanism into the base jaw is determined, and accordingly the force detection occurs at a location which lies after the direction-changing drive mechanism but before a separation point between the base jaw and the top jaw, so that the connection of said force measuring strip with the signal line is kept from being separated during achange of said top jaw; said direction-changing mechanism including a wedge hook separate from said base jaw, and a neck-down shaft that is provided to secure said wedge hook non-rotatably on said base jaw, whereby radial force is introduced via said necked-down shaft into said base jaw, said at least one force measuring strip being arranged on said necked-down shaft.

2. A rotary chuck for machine tools with multiple clamping jaws guided in radial direction in a chuck body, said jaws being actuatable via a direction-changing drive mechanism by a drive element shiftable in axial direction by a drive so that said clamping jaws move in radial direction with the chuck body for gripping respectively releasing a workpiece, whereby said clamping jaws are subdivided into a base jaw and a top jaw for adaptation to different diameters of workpieces to be clamped therewith, said top jaw being secured interchangeably on the base jaw and also being secured therewith displaceably relative to the base jaw, and whereby the base jaw remaining in the chuck body during changing and adjustment of the top jaw cooperates with the direction-changing drive mechanism, whereby for determination of the clamping force applied to the workpiece by the clamping jaws there is provided the improvement therewith comprising:

at least one force measuring strip arranged in the chuck body, said force measuring strip being arranged respectively in the base jaw so that for preventon of any interruption of any signal line during changing, as well as displacement of the top jaw, such that radial force introduced by the drive element via the direction-changing drive mechanism into the base jaw is determined, and accordingly the force detection occurs at a location which lies after the direction-changing drive mechanism but before a spearation point between the base jaw and the top jaw, so that the connection of said force measuring strip with the signal line is kept from being separated during a change of said top jaw; said direction-changing mechanism including an angle lever, and a pressure-stressed pin to which radial force is applied as introduced into said base jaw by said angle lever, said pressure-stressed pin being arranged in said base jaw and being provided with said at least one forcing measuring strip.

3. A rotary chuck including a body having radial guides as well as including a plurality of clamping elements provided as primary jaw parts radially adjustable in the radial guides and movable for engaging a respective workpiece, said clamping elements being adapted to be actuated by a force-operation via a direction-changing drive; each clamping element including a clamping element jaw part which directly engages a workpiece and is interchangeable to adapt to differently dimensioned workpieces, and a drive jaw part for operative cooperation with said clamping element jaw part, said drive jaw part remaining non-removable in said chuck during an exchange of said clamping element jaw part; and the improvement in combination therewith comprising:

a clamping pressure detector provided operatively with said drive jaw part to stay in place therewith in a location considered in the direction of the force introduced from said force-operation, said clamping pressure detector specifically being subsequent to location of said direction-changing drive effective relative to said drive jaw part and located ahead of a joint face between said clamping element jaw part and said drive jaw part so that measured values of clamping pressure are obtained only indirectly via reaction force by said clamping pressure detector provided relative to said drive jaw part without being subject to interruption and disturbance during adjustment movement and interchange as well as displacement movement of said clamping element jaw part rather than directly at locations of movable clamping element jaw parts subject to frictional forces which would falsify resulting measured values as well as being subject to interchange and displacement movement although now always ready for measuring not only when the chuck is stationary but also when the chuck rotates, such that said clamping pressure detector delivers indirectly only satisfactory measured values of reaction force in every state of operation of a clamped-in workpiece and such that these measured values can be used as control and adjustment factors for determination of clamping force of the rotary chuck; said drive jaw part being a base jaw having a jaw body and a wedge hook;

said clamping element jaw part being a top jaw a chuck piston operatively arranged therewith a wedge-type drive for changing the direction of force between said chuck piston and said clamping elements;

an elongation element for mounting said wedge hook of at least one of said base jaws on the respective jaw body thereof; and strain gauges provided with said elongation element for determining clamping pressure.

4. A rotary chuck including a body having radial guides as well as including a plurality of clamping elements provided as primary jaw parts radially adjustable in the radial guides and movable for engaging a respective workpiece, said clamping elements being adapted to be actuated by a force-operation via a direction-changing drive; each clamping element including a clamping element jaw part which directly engages a workpiece and is interchangeable to adapt to differently dimensioned workpieces, and a drive jaw part for operative cooperation with said clamping element jaw part, said drive jaw part remaining non-removable in said chuck during an exchange of said clamping element jaw part; and the improvement in combination therewith comprising:

a clamping pressure detector provided operatively with said drive jaw part to stay in place therewith in a location considered in the direction of the force introduced from said force-operation, said clamping pressure detector specifically being subsequent to location of said direction-changing drive effective relative to said drive jaw part and located ahead of a joint face between said clamping element jaw part and said drive jaw part so that measured values of clamping pressure are obtained only indirectly via reaction force by said clamping pressure detector provided relative to said drive jaw part without being subject to interruption and disturbance during adjustment movement and interchange as well as displacement movement of said clamping element jaw part rather than directly at locations of movable clamping element jaw parts subject to frictional forces which would falsify resulting measured values as well as being subject to interchange and displacement movement although now always ready for measuring not only when the chuck is stationary but also when the chuck rotates, such that said clamping pressure detector delivers indirectly only satisfactory measured values of reaction force in every state of operation of a clamped-in workpiece and such that these measured values can be used as control and adjustment factors for determination of clamping force of the rotary chuck;

said drive jaw part being a base jaw having a jaw body;

said clamping element jaw part being a top jaw a chuck piston operatively arranged therewith;

a lever direction-changing drive including at least one angle lever for changing the direction of force between said chuck piston and said clamping element jaw part;

a pressure-stressed pin arranged with said clamping element jaw part and engaged by said lever direction-changing drive; and a force-measuring member arranged on said pressure-stressed pin between at least one angle lever of said direction-changing drive, and the respective drive jaw part belonging therewith.

5. A rotary chuck in combination according to claim 4, in which said base jaw is provided with a bore, and in which said force-measuring member is a pressure-stressed pin which is provided with tension measuring strips.

6. A rotary chuck in combination according to claim 5, in which said base jaw, in the area of application of said lever, is provided with a definite elongation cross section with which are associated tension measuring members.

* * * * *